(12) United States Patent
Iwamoto

(10) Patent No.: US 10,035,721 B2
(45) Date of Patent: Jul. 31, 2018

(54) PRODUCTION METHOD FOR PATTERNED PHOSPHORESCENT BODY, PATTERNED PHOSPHORESCENT BODY, AND EVACUATION GUIDE SIGN

(71) Applicant: CODOMO ENERGY CO., LTD., Osaka (JP)

(72) Inventor: Yasunori Iwamoto, Osaka (JP)

(73) Assignee: CODOMO ENERGY CO., LTD., Osaka (JP)

(*) Notice: Subject to any disclaimer, the term of this patent is extended or adjusted under 35 U.S.C. 154(b) by 0 days.

(21) Appl. No.: 15/322,025

(22) PCT Filed: Jun. 17, 2015

(86) PCT No.: PCT/JP2015/067450
§ 371 (c)(1),
(2) Date: Dec. 23, 2016

(87) PCT Pub. No.: WO2015/198938
PCT Pub. Date: Dec. 30, 2015

(65) Prior Publication Data
US 2017/0144914 A1    May 25, 2017

(30) Foreign Application Priority Data
Jun. 23, 2014 (JP) ................... 2014-127948

(51) Int. Cl.
*C03B 19/06* (2006.01)
*G09F 13/20* (2006.01)
(Continued)

(52) U.S. Cl.
CPC ............... *C03B 19/06* (2013.01); *A62B 3/00* (2013.01); *B44C 1/175* (2013.01); *C03C 14/006* (2013.01);
(Continued)

(58) Field of Classification Search
CPC ........... G08B 7/062; C03B 19/06; A62B 3/00; B44C 1/175; C03C 14/006;
(Continued)

(56) References Cited

U.S. PATENT DOCUMENTS 3,981,761 A * 9/1976 Kojima ................ B41M 3/12
156/235
6,287,993 B1   9/2001 Fu et al.
(Continued)

FOREIGN PATENT DOCUMENTS

CA    2 512 259 A1    1/2007
JP    2000-281382 A    10/2000
(Continued)

OTHER PUBLICATIONS

Extended Search Report issued in European Patent Application No. 15811399.3, dated Apr. 19, 2017.
(Continued)

*Primary Examiner* — Queenie S Dehghan
(74) *Attorney, Agent, or Firm* — Michael Best & Friedrich LLP

(57) ABSTRACT

Provided are: a production method for a patterned phosphorescent body capable of producing a patterned phosphorescent body with excellent light emission (phosphorescent) performance through simple and easy production processes; a patterned phosphorescent body, and an evacuation guide sign. A mixture obtained by mixing at least a phosphorescent material and a glass material is filled in a mold and the mixture is press-molded so as to provide a planar part (10), thereby to create a molded body. The molded body is baked and slowly cooled, and then transfer paper of a water transfer type is attached to a surface of the planar part (10) of the baked molded body (4) and re-baking is performed at
(Continued)

a temperature lower than a baking temperature of the molded body to impress a pattern (11) on the transfer paper.

8 Claims, 4 Drawing Sheets

(51) Int. Cl.
| | |
|---|---|
| *A62B 3/00* | (2006.01) |
| *F21V 9/30* | (2018.01) |
| *F21S 2/00* | (2016.01) |
| *F21V 9/16* | (2006.01) |
| *B44C 1/175* | (2006.01) |
| *C03C 14/00* | (2006.01) |
| *C09K 11/00* | (2006.01) |
| *G08B 7/06* | (2006.01) |

(52) U.S. Cl.
CPC .................. *F21S 2/00* (2013.01); *F21V 9/16* (2013.01); *F21V 9/30* (2018.02); *G09F 13/20* (2013.01); *C03C 2214/04* (2013.01); *C03C 2214/16* (2013.01); *C09K 11/00* (2013.01); *G08B 7/062* (2013.01); *Y02P 40/57* (2015.11)

(58) Field of Classification Search
CPC .... C03C 2214/04; C03C 2214/16; F21S 2/00; F21V 9/16; G09F 13/20; C09K 11/00
See application file for complete search history.

(56) References Cited

U.S. PATENT DOCUMENTS

| | | | | |
|---|---|---|---|---|
| 7,963,817 | B2* | 6/2011 | Kameshima | .......... C03C 14/004 313/512 |
| 8,250,794 | B2* | 8/2012 | Hannington | ........... G08B 7/062 362/34 |
| 9,333,789 | B2* | 5/2016 | Manwiller | ............ B44C 1/1716 |
| 2010/0136305 | A1 | 6/2010 | Sakai | |

FOREIGN PATENT DOCUMENTS

| | | |
|---|---|---|
| JP | 2004-175603 A | 6/2004 |
| JP | 2006-285880 A | 10/2006 |
| JP | 2008-116626 A | 5/2008 |
| JP | 2009-096879 A | 5/2009 |
| JP | 2012-087035 A | 5/2012 |

OTHER PUBLICATIONS

International Search Report issued in Application No. PCT/JP2015/067450, dated Aug. 25, 2015.

* cited by examiner

PRODUCTION METHOD FOR PATTERNED PHOSPHORESCENT BODY, PATTERNED PHOSPHORESCENT BODY, AND EVACUATION GUIDE SIGN

TECHNICAL FIELD

The present invention relates to a production method for a patterned phosphorescent body, a patterned phosphorescent body, and an evacuation guide sign. The invention more specifically relates to a production method for a patterned phosphorescent body containing a phosphorescent material and a glass material, a patterned phosphorescent body, and an evacuation guide sign.

BACKGROUND ART

Conventionally known as a patterned phosphorescent body and an evacuation guide sign using such a patterned phosphorescent body as described above is, for example, a phosphorescent evacuation guide plate disclosed in Patent Literature 1. This evacuation guide plate is obtained by providing a glaze layer on a surface of a stainless substrate, then applying a pasty glass flit layer, further densely holding, thereon, phosphorescent material particles, applying a pasty glass flit layer onto a phosphorescent material layer formed of the held phosphorescent material particles, further applying, thereon, a pattern layer and a glass flit layer, and performing baking. Thus, production processes were difficult and complicated. Moreover, the stainless substrate and the glass flit have largely different thermal expansion rates, which therefore has required adjustment of the thermal expansion rates between the materials for the purpose of suppressing occurrence of cracking, breakage, warpage, etc.

CITATION LIST

Patent Documents

[PATENT DOCUMENT 1] Japanese Laid-Open Patent Publication No. 2006-285880

SUMMARY OF THE INVENTION

Problems to be Solved by the Invention

In view of the conventional circumstances, it is an object of the present invention to provide: a production method for a patterned phosphorescent body, capable of producing a patterned phosphorescent body with excellent light emission (phosphorescent) performance through easy and simple production processes; a patterned phosphorescent body; and an evacuation guide sign.

Solution to the Problems

To address the object described above, a production method for a patterned phosphorescent body according to the present invention is characterized by, in a production method for a patterned phosphorescent body containing a phosphorescent material and a glass material, including: filling, in a mold, a mixture obtained by mixing at least the phosphorescent material and the glass material and press-molding the mixture so as to have a planar part, thereby to create a molded body, baking and slowly cooling the molded body, and then attaching transfer paper of a water transfer type to a surface of the planar part of the baked molded body and performing re-baking at a temperature lower than a baking temperature of the molded body to impress a pattern on the transfer paper.

With the configuration described above, since the molded body obtained by press-molding the mixture so as to have the planar part is first baked and then the transfer paper of a water transfer type is attached to the surface of the planar part of the baked molded body and re-baking is performed at a temperature lower than the baking temperature of the molded body, the molded body is not shrunk through the re-baking, which can maintain accuracy of the pattern formed by the transfer paper. Moreover, since the molded body obtained by press-molding of the mixture is first baked, the attachment of the transfer paper of a water transfer type to the entire surface of the planar part of the baked molded body does not cause water impregnation in the molded body, causing no deterioration and no deformation of the molded body. In addition, adjustment of a thermal expansion rate, which has been required in conventional art, is no longer required, permitting the production through easy production processes. Further, even when the baked molded body is below the standards, the baked molded body can be pulverized and recycled before the attachment of the transfer paper.

The mixture may include a water-soluble binder. Since the water-soluble binder is included, there is hardly any problem of exhaust gas occurring upon the baking, and there is hardly any residual substance remaining on the molded body after the baking. Therefore, brightness deterioration caused by the residual substance can be suppressed. For example, one which contains methylcellulose is used as the water-soluble binder.

The phosphorescent material may have a greater particle size than the glass material. As a result, providing the greater particle size of the phosphorescent material permits accumulation of more light, which improves light emission performance. In addition, providing the smaller particle size of the glass material makes it easy for the glass material to melt, permitting short-term baking at a low temperature.

In such a case, the particle size of the phosphorescent material may be at least 100 μm and no greater than 200 μm, and the particle size of the glass material may be at least 20 μm and no greater than 40 μm. With the particle size of the phosphorescent material in the numerical range described above, the phosphorescent material can sufficiently store light, avoiding deterioration in the light emission (phosphorescence) performance, and the pattern on the transfer paper is not broken as a result of formation of an uneven surface due to a failure to flatten the surface by the phosphorescent material. Moreover, with the particle size of the glass material in the numerical range described above, it is possible to perform short-term baking and also ensure flowability, which can flatten the surface of the molded body subjected to the baking.

The mixture may be obtained by stirring and mixing together the phosphorescent material and the glass material with a weight ratio of at least 10:90 and no greater than 35:65. Within the numerical range, the light emission performance provided by the phosphorescent material does not deteriorate, and the surface of the planar part of the molded body can be flattened through melting of the glass material.

To address the object described above, a patterned phosphorescent body according to the invention is characterized by, with a configuration containing a phosphorescent material and a glass material, being obtained by: filling, in a mold, a mixture obtained by mixing at least the phosphorescent material and the glass material and press-molding the mixture so as to have a planar part, thereby to create a molded body, baking and slowly cooling the molded body, and then attaching transfer paper of a water transfer type to a surface of the planar part of the baked molded body and performing re-baking at a temperature lower than a baking temperature of the molded body to impress a pattern on the transfer paper. This patterned phosphorescent body is used as, for example, an evacuation guide plate.

Advantageous Effects of the Invention

With the production method for a patterned phosphorescent body, the patterned phosphorescent body, and the evacuation guide sign according to the present invention described above, a phosphorescent body with excellent light emission (phosphorescent) performance can be produced through easy and simple production processes.

Other objects, configuration, and effects of the invention will be clarified from embodiments of the invention described below.

DESCRIPTION OF EMBODIMENTS

Figure 1A:
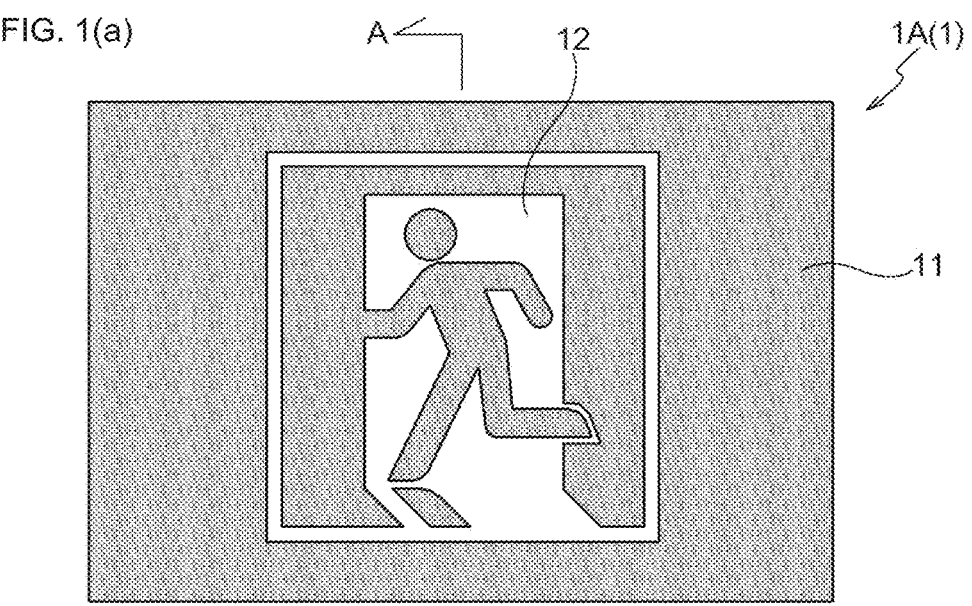
FIG. 1 illustrates a patterned phosphorescent body according to the present invention, in which (a) illustrates an elevation view thereof and (b) illustrates a sectional view taken along a line A-A in (a).
Figure 1B:
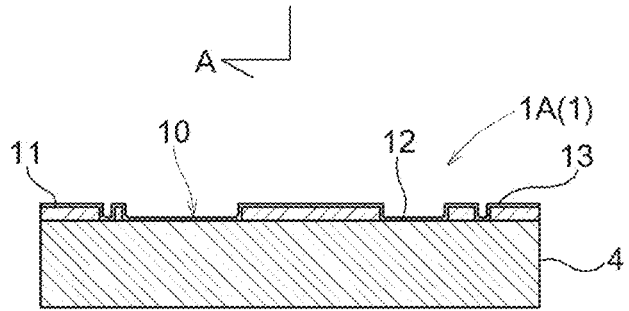

Next, the present invention will be described in more detail with reference to the accompanying drawings when necessary. As illustrated in FIG. 1, a patterned phosphorescent body 1 according to the invention takes on a form of a flat plate containing a phosphorescent colorant as a phosphorescent material and a glass flit as a glass material. This patterned phosphorescent body 1 is embodied, for example, as an evacuation guide sign 1A. The evacuation guide sign 1A has a molded body 4 subjected to baking (hereinafter also referred to as baked molded body 4) and functioning as a substrate, and has a planar part 10 which has, on a surface thereof, a transfer section (pattern section) 11 provided through transfer to be described later on. In the present embodiment, the transfer section 11 is formed of a material that is not light permeable, and a non-transfer section where the transfer section 11 is not formed is provided as a light emission (phosphorescent) section 12. A coating layer 13 is formed on a surface.

Here, used as the phosphorescent colorant is, for example, one which is primarily consisting of an aluminate compound of alkali earth metal and which is obtained by baking with an addition of an activator agent of a rear-earth element and a coactivator. Examples of the alkali earth metals include at least one of metal elements such as calcium, strontium, barium, etc. and alloys of these metal elements and magnesium. Examples of the activator agents of a rear-earth element include europium and dysprosium. Examples of the coactivators include elements such as lanthanum, cerium, praseodymium, neodymium, samarium, cadmium, terbium, and dysprosium. Moreover, as the phosphorescent colorant, in addition to the oxide phosphor as described above, sulfide phosphors for CaS:Bi (violet-blue emission), CaSrS:Bi (blue emission), ZnS:Cu (green emission), ZnCdS:Cu (yellow to orange emission), etc. can also be used. Note that the aforementioned compounds can appropriately be mixed together to be used, and it is also possible to further use any of other inorganic fluorescent colorants and organic fluorescent colorants with phosphorescent performance.

Moreover, used as a material of the glass flit is, for example, one including at least one kind of alkaline earth metal oxide selected from a group primarily consisting of silicone oxide, aluminum oxide, boric oxide, and alkali oxide and also consisting of calcium oxide, strontium oxide, and magnesium oxide. Note that the materials of the glass flit are not limited to those described above, but one which can be melted (liquefied) at a temperature at which the aforementioned phosphorescent colorant can be present in a solid state may be used. Moreover, a material of the glass flit that is high in transparency is desirably used after the baking. Light emission of the phosphorescent colorant is not disturbed, thereby preventing deterioration in light emission performance.

The phosphorescent colorant has a particle size of at least 100 μm and no greater than 200 μm and preferably at least 130 μm and no greater than 170 μm. A particle size of less than 100 μm is small, so that sufficient light cannot be stored, leading to deterioration in the light emission (phosphorescent) performance. On the other hand, with a particle size greater than 200 μm, baking of a mixture 2, to be described later on, results in a failure to flatten a surface of the planar part 10 due to presence of particles of the phosphorescent colorant, leading to a risk that a transfer paper 5 (an image part 12), to be described later on, is broken by the phosphorescent colorant projected from the surface. The "particle size" described in the present specification indicates a value of an average particle size $d_{50}$ in viscosity distribution.

The glass flit preferably has a particle size of at least 20 μm and no greater than 40 μm, and the particle size of the glass flit is smaller than that of the phosphorescent colorant. Providing the small particle size of the glass flit permits production of a patterned phosphorescent body through heating at a relatively low temperature of 700 to 800° C., which requires a short heating time of approximately two to five hours. Moreover, a large number of glass flit particles can be present around the phosphorescent colorant, and thus a surface of the baked molded body 4 can be flattened through heating. With a particle size of less than 20 μm, the phosphorescent colorant is not sufficiently mixed with the glass flit and located near a surface of the mixture 2, and thus the surface of the baked molded body 4 is not flattened. On the other hand, with a particle size greater than 40 μm, melting time increases, resulting in deteriorated production efficiency.

Here, processes of producing the evacuation guide sign 1A as the patterned phosphorescent body 1 will be described.

The production processes roughly include: a mixture creation process for creating the mixture 2; a pressing process for filling the created mixture 2 in a mold 21 and press-molding the mixture 2 so as to have the planar part 10, thereby creating a molded body 3; a baking process for baking and slowly cooling the molded body 3 obtained through the press-molding; and a re-baking process for attaching the transfer paper 5 of a water transfer type to the baked molded body 4 obtained by baking the molded body 3.

In the mixture creation process, the powders of the phosphorescent colorant and the glass flit are stirred and mixed together with a water-soluble binder to create the mixture 2. The phosphorescent colorant and the glass flit are stirred and mixed together with a weight ratio of at least 10:90 and no greater than 35:65. Preferably, the weight ratio between the phosphorescent colorant and the glass flit is at least 20:80 and no greater than 30:70. If the weight of the phosphorescent colorant is smaller than the aforementioned ratio, sufficient light emission (phosphorescent) performance cannot be ensured. On the other hand, if the weight of the phosphorescent colorant is greater than the aforementioned ratio, the weight of the glass material is relatively small, so that moldability upon the press-molding cannot be ensured, resulting in a failure to form the surface of the planar part 10 into a flat form also upon the baking.

Here, Table 1 illustrates one example of results of blending ratios (phosphorescent colorant:grass flit) between the phosphorescent colorant and the glass flit (with a particle size of 30 μm) with forming states and surface states of the coating layer 13. Note that a phosphorescent colorant produced by NEMOTO LUMI-MATERIALS CO., LTD. (in green with a particle size of 160 μm) was used for Sample 1, a phosphorescent colorant produced by RYOKO CO., LTD. (in blue with a particle size of 150 μm) was used for Sample 2. In tables, marks • denote that surface roughness is good and marks x denote that the surface roughness is not good.

TABLE 1

| Blending ratio Baking | Sample 1 | | | | | Sample 2 | | | | |
|---|---|---|---|---|---|---|---|---|---|---|
| temperature | 1:9 | 2:8 | 2.5:7.5 | 3:7 | 4:6 | 1:9 | 2:8 | 2.5:7.5 | 3:7 | 4:6 |
| 750° C. | • | • | • | • | X | • | • | • | • | X |
| 800° C. | • | • | • | • | X | • | • | • | • | X |
| 850° C. | • | • | • | • | X | • | • | • | • | X |
| 900° C. | • | • | • | • | X | • | • | • | • | X |

When the blending ratio between the phosphorescent colorant and the glass flit is 4:6, the glass flit is relatively small in amount, so that the surfaces of many of the molded bodies already subjected to the baking were not flattened. On the other hand, when the blending ratio is 3:7, 2:8, or 1:9, the glass flit relatively increased in amount, so that the surfaces were formed into a flat form.

Figure 2:
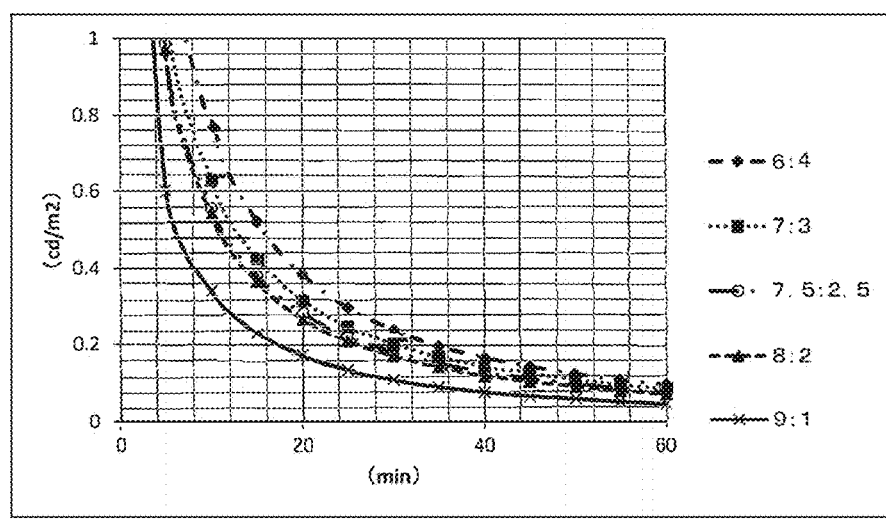
FIG. 2 is a graph illustrating relationship between time and afterglow brightness for different blending ratios between a phosphorescent colorant with a particle size of 160 μm and a glass flit with a particle size of 30 μm.

Here, FIG. 2 illustrates a relationship between time and afterglow brightness for the different blending ratios. As illustrated in the figures, with a decrease in proportion of the phosphorescent colorant, the brightness decreases at almost all the time. Particularly in a case where the blending ratio between the phosphorescent colorant and the glass flit is 1:9, the brightness is lower than that with the other blending ratios. As described above, molding at a low temperature in short time based on the afterglow brightness and the surface state of the phosphorescent body can be performed, and the weight ratio between the phosphorescent colorant and the glass flit is preferably at least 2.8 and no greater than 3:7.

Subsequently, a predetermined amount of a water-soluble binder is added to a total amount of the prepared solid components (the powdery phosphorescent colorant and the powdery glass flit), and stirring and mixing are performed to create the mixture 2. For example, a methylcellulose watery solution is used as the water-soluble binder. This watery solution has a concentration of at least 2% and no greater than 3%, and at least 6% and no greater than 8% relative to the total amount of the solid components can be added. Within the numerical range described above, moldability of the mixture 2 can be maintained and binder removal time upon baking is shortened, which suppresses remaining of the water-soluble binder and prevents brightness deterioration.

Figure 3:
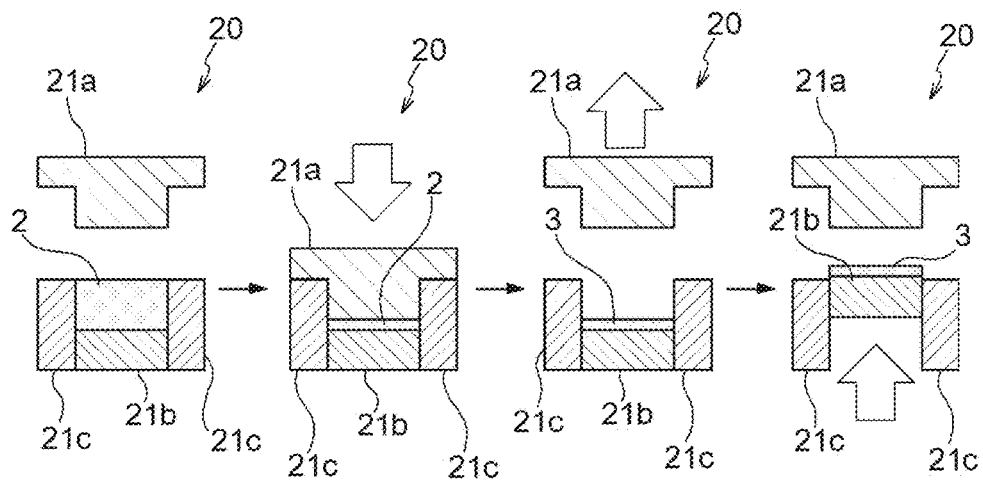
FIG. 3 is a view illustrating a press-molding process.

Next, in the press-molding process, for example, as illustrated in FIG. 3, the mixture 2 described above is filled in a recessed part of the mold 21 of a pressing machine 20, and press-molding is performed with, for example, 600 kgf/cm² to 800 kgf/cm². Then a lower mold 21b is lifted up along a side mold 21c to take out the molded body 3 that has been press-molded. In the present embodiment, the molded body 3 of a flat plate shape is molded into a flat plate shape, and the planar part 10 thereof is formed into a substantially planar surface.

Figure 4:
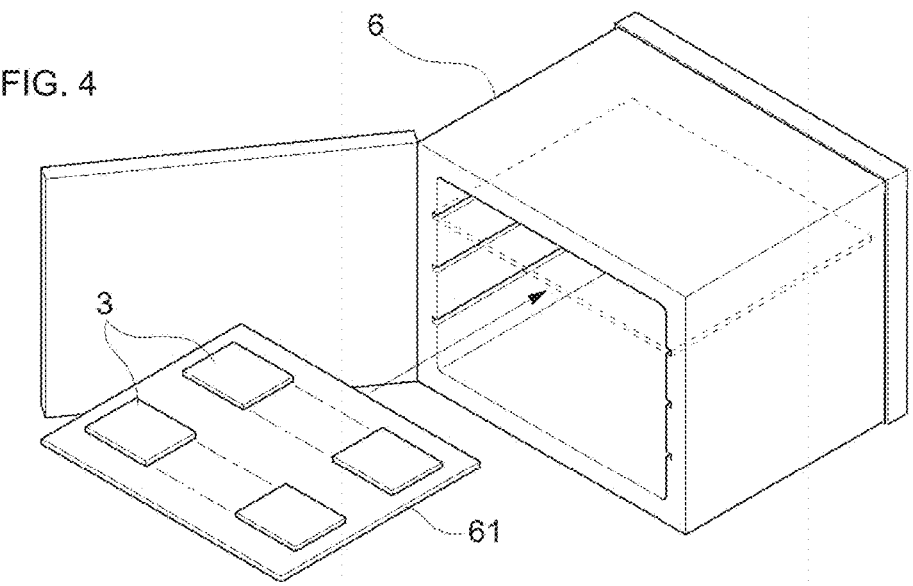
FIG. 4 is a view illustrating a baking process.
Figure 5A:
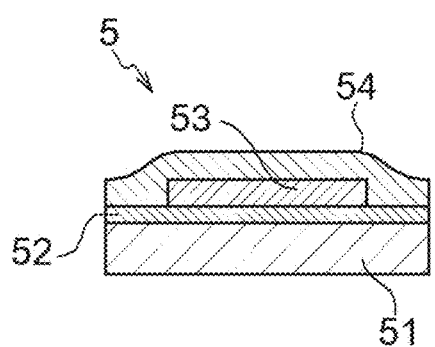
FIG. 5 illustrates a transfer process, in which (a) illustrates a sectional view of water transfer paper, (b) illustrates a view of a mounting separated from the water transfer paper, (c) illustrates alignment of a transfer portion with a baked molded body, and (d) illustrates a state after re-baking.
Figure 5B:
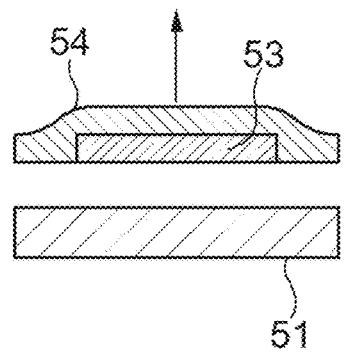
Figure 5C:
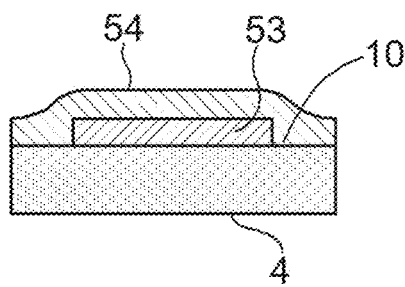
Figure 5D:
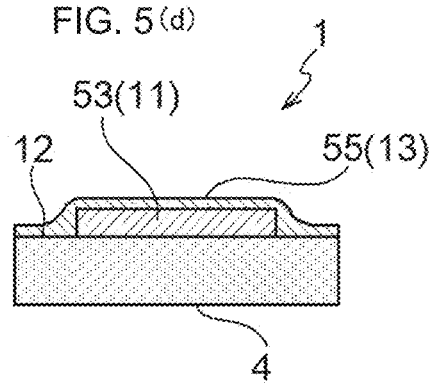

Then in the baking process, for example, as illustrated in FIG. 4, a plurality of the molded bodies 3 are arranged on a shelf plate 61 of a baking furnace 6, put in the baking furnace 6, and baked at a predetermined temperature (for example, 800° C.). The baking process can be performed through a batch method or continuous baking in a line, and the same applied to the following. At this baking temperature, the glass flit melts, turning into a liquid glass component. On the other hand, the phosphorescent colorant has a higher melting point than the glass flit, and is present in a solid state at a melting temperature of the glass flit. Therefore, the glass flit melted through the baking surrounds the phosphorescent colorant, flattening the surface of the planar part 10 of the baked molded body 4. In addition, the phosphorescent colorant is present in the molded body 3 densely with each other as a result of the press-molding, so that the brightness of the baked molded body 4 obtained by baking the molded body 3 is kept equivalent to that of the phosphorescent colorant itself, which can suppress brightness deterioration as a result of the molding and the baking. Then, after slow cooling for a predetermined time, the shelf plate 61 is taken out. Note that, for example, an alumina sheet is used as the shelf plate 61, but no limitations are placed on the material and the structure of the shelf plate 61, and any material and structure may be adopted so long as the material and the structure are not sintered with the molded body 3.

In the re-baking process, the transfer paper 5 of a water transfer type is attached to the surface of the planar part 10 of the baked molded body 4 taken out from the baking furnace 6. Here, as illustrated in (a) of FIG. 5, the water transfer paper 5 is roughly composed of: a mounting 51 formed of, for example, PET paper; a water-soluble resin layer 52; a printing layer 53 that forms an image; and a cover coat layer 54 that covers the water-soluble resin layer 52 and the printing layer 53. The cover coat layer 54 is formed of the same glass material as that of the glass flit described above. These layers are so formed as to be laminated on the mounting 51 by a method such as screen printing. Note that a glass flit layer similar to the cover coat layer 54 may further be provided between the water-soluble resin layer 52 and the printing layer 53 or the cover coat layer 54. As a result, the printing layer 53 can be held after the water-soluble resin layer 52 is dissolved, which can therefore prevent, for example, deformation, displacement, and breakage of the printing layer 53.

The water transfer paper 5 is soaked in water to dissolve the water-soluble resin layer 52 formed on a surface of the mounting 51 and separate the mounting 51 ((b) of FIG. 5).

Then the separated printing layer 53 and cover coat layer 54 are attached to the baked molded body 4 in alignment therewith ((c) of FIG. 5). Here, the baked molded body 4 is obtained by press-molding and baking the mixture 2 formed of the phosphorescent colorant and the glass flit. Therefore, even when the water transfer paper 5 is used for the baked molded body 4, the water is not included in the baked molded body 4 and thus light emission performance does not deteriorate. The printing layer 53 is arranged at a predetermined position of the planar part 10 of the baked molded body 4 after the mounting 51 has been removed.

Then the baked molded body 4 to which the transfer paper 5 is attached is re-baked ((d) of FIG. 5). At this point, the baking is performed at a temperature lower than a baking temperature adopted in the aforementioned baking process. For example, the temperature is less than 700° C. This is lower than a typical overglaze baking temperature (720° C. to 820° C.). Since the molded body 4 has once been baked, the baked molded body 4 is not shrunk even when re-baked at a temperature lower than the baking temperature. On the other hand, the cover coat layer 54 is formed of the same glass flit, and thus melts at approximately 700° C. Therefore, these layers melt, turning into a coating layer 55. At this point, the baked molded body 4 is not shrunk, so that displacement, displacement caused by a difference in thermal expansion ratio, bonding failure or cracking of the printing layer 53, etc. do not occur, permitting accurate printing. In the manner described above, the patterned phosphorescent body 1 is created.

Next, possibilities of other embodiments will be finally described. Note that, in the embodiments below, the same members, etc. as those of the embodiment described above are marked with the same numerals.

In the embodiment described above, as the pattern section 11, a human shape and a surrounding portion thereof are provided as a portion which is formed by the printing layer 53 and on which no light emission occurs. However, the human shape and the surrounding portion thereof may be provided as the light emission section 12.

In the embodiment described above, the printing layer 53 (pattern section 11) is formed as a pictogram, and the patterned phosphorescent body 1 is formed as the evacuation guide sign 1A. However, the pattern is not limited to the pictogram, and includes any of various graphs, designs, signs, characters, images, etc.

In the embodiment described above, the mixture 2 is press-molded to create the molded body of a flat plate shape having the planar part 10 formed into a substantially planar surface, and the pattern section 11 is formed on the surface of the planar part 10. However, the planar part 10 is not limited to a plane surface so long as transfer can be performed as described above. For example, it is also possible to perform transfer on a molded body of, for example, a spherical shape or an oval shape having a curved surface to provide a patterned phosphorescent body.

INDUSTRIAL APPLICABILITY

The present invention can be used as a production method for a patterned phosphorescent body, a patterned phosphorescent body, and an evacuation guide sign. Moreover, the present invention is not limited to the evacuation guide sign, and can also be used as any of various information display means such as an advertisement and a guide plate. The present invention is composed of a phosphorescent colorant and a glass material, and is thus excellent in weather resistance, water resistance, heat resistance, friction resistance, and chemical resistance, and can be used for long time not only in an indoor site but also in an outdoor site.

DESCRIPTION OF THE REFERENCE CHARACTERS 1 patterned phosphorescent body
2 mixture
3 molded body
4 baked molded body
5 water transfer paper
6 baking furnace
1A evacuation guide sign
10 planar part
11 transfer section (pattern section)
12 light emission (phosphorescent) section
13 coating layer
20 pressing machine
21 mold
21a upper mold
21b lower mold
21c side mold
51 mounting
52 water-soluble resin layer
53 printing layer
54 cover coat layer
55 coating layer
61 shelf plate

The invention claimed is:

1. A production method for a patterned phosphorescent body containing a phosphorescent material and a glass material, the production method comprising:
   filling, in a mold, a mixture obtained by mixing at least the phosphorescent material and the glass material and press-molding the mixture, thereby to create a molded body having a planar part;
   baking the molded body at a baking temperature and thereafter cooling the molded body; and
   attaching a transfer paper to a surface of the planar part of the baked molded body, wherein the transfer paper comprises a pattern and a cover coat layer of a glass material that covers the pattern; and
   re-baking the molded body at a temperature lower than the baking temperature to impress the pattern whereby forming a coating layer of the cover coat layer on the planar part.

2. The production method for a patterned phosphorescent body according to claim 1, wherein the mixture includes a water-soluble binder.

3. The production method for a patterned phosphorescent body according to claim 2, wherein the water-soluble binder contains methylcellulose.

4. The production method for a patterned phosphorescent body according to claim 1, wherein the phosphorescent material has a greater particle size than the glass material.

5. The production method for a patterned phosphorescent body according to claim 4 wherein the mixture is obtained by stirring and mixing together the phosphorescent material and the glass material with a weight ratio of at least 10:90 and no greater than 35:65.

6. The production method for a patterned phosphorescent body according to claim 1 wherein the mixture is obtained by stirring and mixing together the phosphorescent material and the glass material with a weight ratio of at least 10:90 and no greater than 35:65.

7. The production method for a patterned phosphorescent body according to claim 1, wherein the molded body is of a flat plate shape.

8. The production method for a patterned phosphorescent body according to claim 1, wherein the transfer paper is of a water transfer type.

* * * * *